United States Patent [19]

Wehnert et al.

[11] Patent Number: 4,777,215

[45] Date of Patent: Oct. 11, 1988

[54] THERMOPLASTIC MIXTURES OF AROMATIC POLYCARBONATES AND POLYSTYRENES AND THEIR USE AS SUBSTRATES FOR OPTICAL DATA MEMORIES

[75] Inventors: Wolfgang Wehnert, Krefeld; Ulrich Grigo, Kempen; Helmut Schmid, Krefeld; Joachim Wagner, Cologne, all of Fed. Rep. of Germany

[73] Assignee: Bayer Aktiengesellschaft, Leverkusen, Fed. Rep. of Germany

[21] Appl. No.: 107,109

[22] Filed: Oct. 13, 1987

[30] Foreign Application Priority Data

Oct. 22, 1986 [DE] Fed. Rep. of Germany ....... 3635825

[51] Int. Cl.$^4$ .............................................. C08L 69/00
[52] U.S. Cl. ..................................... 525/146; 525/468
[58] Field of Search ................ 525/146, 468; 528/196, 528/204

[56] References Cited

U.S. PATENT DOCUMENTS 4,657,980  4/1987  Fujita et al. .......................... 525/146

FOREIGN PATENT DOCUMENTS 8404317  8/1984  PCT Int'l Appl. .

OTHER PUBLICATIONS

Patent Abstracts of Japan, Band 7, No. 201 (C-184)[1346], 6 Sep. 1983; & JP-A-58 101 112 (Idemitsu Kosan K. K.), 16-06-1983.
Journal of Applied Polymer Science, Band 26, No. 2, Feb. 1981, pp. 499-508, John Wiley & Sons, Inc., New York, U.S.; Y. S. Lipatov et al.

Primary Examiner—Theodore E. Pertilla
Attorney, Agent, or Firm—Connolly and Hutz

[57] ABSTRACT

The present invention relates to thermoplastic mixtures of 90 to 20% by weight of an aromatic polycarbonate with an $\overline{M}w$ of 15,000 to 25,000 and p-(iso-$C_8$–$C_9$-alkyl)-phenyl end groups and 10 to 80% by weight of a polystyrene with an $\overline{M}w$ of 80,000 to 400,000, and to their use as substrates for optical data memories.

8 Claims, No Drawings

THERMOPLASTIC MIXTURES OF AROMATIC POLYCARBONATES AND POLYSTYRENES AND THEIR USE AS SUBSTRATES FOR OPTICAL DATA MEMORIES

The present invention relates to mixtures of (A) 90 to 20% by weight, preferably 80 to 45% by weight and in particular 70 to 50% by weight, of an aromatic polycarbonate with an $\overline{M}w$ (weight-average molecular weight, determined by gel permeation chromatography) of 15,000 to 25,000 and p-(iso-$C_8$-$C_9$-alkyl)-phenyl end groups and (B) 10 to 80% by weight, preferably 20 to 55% by weight and in particular 30 to 50% by weight, of a polystyrene with an $\overline{M}w$ (weight-average molecular weight, determined via the relative solution viscosity in dimethylformamide at C=5 g/l and 20°·C.) of 80,000 to 400,000.

Because of their low birefringence, the mixtures according to the invention are suitable as substrates for optical data memories, since such mixtures are suitable for the production of shaped articles with a particularly low birefringence in the tangential and radial direction relative to the disc surface.

The present invention thus also relates to the use of the mixtures according to the invention as substrates for optical data memories.

The information in optical data carriers is read, and in the case of data memories which can be written on, also written in, with the linearly polarized light of a laser. Magneto-optical data memories are one of the systems for methods which can be written and erased: in this case, particular emphasis must be placed on substrate material which is free from birefringence, since even a slight rotation (less than 1°) of the optical vibration plane is read as a signal.

Birefringence in plastics (thermoplastics) is essentially composed of 2 factors: a material-specific component on the one hand and a portion resulting from processing, which is also called orientation birefringence, on the other hand. Thermoplastic moulded articles of low birefringence can thus be prepared by two measures, either by choosing suitable processing parameters, for example by processing low-viscosity grades at relatively high temperatures, such as, for example, in the injection-moulding or injection compression-moulding of audio compact discs of thermoplastic polycarbonate, or by using material which in itself exhibits only a low tendency towards birefringence, such as, for example, polymethyl methacrylates, which are used for the production of video discs.

Memory systems which can be written on, such as, for example, magneto-optical systems, require a relatively high energy during writing, in order to be able to obtain an acceptable signal/noise ratio. A lens system with a large numerical aperture is used for this. As a result of the angular aperture of the writing and reading lens system, the minimum possible optical anisotropy is also of considerable importance for the optical path in the tangential and radial direction. Thus, compact discs, which already have very low path differences of birefringence (less than 10 nm/mm) in the axial direction, still have high measurement values, typically about 500–1,000 nm/mm, tangentially and radially.

Mixtures of polycarbonates and polystyrenes are known (see DE-AS (German Published Specification) No. 1,109,884). However, the polycarbonates described there have no p-isoalkylphenyl end groups. Nothing is mentioned in DE-AS (German Published Specification) No. 1,109,884 of optical use of the mixtures.

A process for greatly reducing or even eliminating the birefringence of films of plastic by a special surface treatment is known from DE-OS (German Published Specification) No. 3,347,684 (Le A 22 595). Plastics mentioned are polystyrene, polyvinyl chloride, polyacrylic acid esters and polyesters, and in particular polycarbonate. The films are said to have dimensional stability, permeability to water vapour, scratch resistance and insensitivity towards heat, and are said to be easy to shape and chemically resistant towards the effect of various auxiliary chemicals (page 6 of DE-OS (German Published Specification) No. 3,347,684).

Optically monoaxial films of plastic coated with a polyacrylate lacquer, whereby the permeability to water vapour is reduced and the chemical resistance is improved are known from DE-OS (German Published Specification) No. 3,415,104 (Le A 23 047) (page 8, paragraph 5 of the DE-OS (German Published Specification)). As plastics are mentioned, inter alia, polystyrene, styrene/acrylonitrile copolymers, polycarbonate, polyacrylic acid esters, polymethacrylic acid esters, cellulose esters or mixtures of copolymers which contain the polymers mentioned (page 8, last paragraph of the DE-OS (German Published Specification)). Polycarbonate or mixtures of plastics which contain at least 10% by weight of polycarbonate are especially preferred (page 9, paragraph 1 of DE-OS (German Published Specification) No. 3,415,104). Mixtures of polymers which give optically transparent plastics are also suitable. The advantage of these mixtures is an improvement in the mechanical and in particular the chemical properties, above all the resistance of the plastic towards the constituents of the liquid crystal phase at elevated temperatures. Mixtures with silicones or polyesters are preferred (DE-OS (German Published Specification) No. 3,415,104, pages 12/13).

The polycarbonates described in DE-OS (German Published Specification) No. 3,415,104 have weight-average molecular weights $\overline{M}w$ of between 10,000 and 100,000, preferably between 20,000 and 40,000 and for cast material preferably 75,000 to 110,000 (page 10, paragraph 1 of DE-OS (German Published Specification) No. 3,415,104), No p-(iso-$C_8$-$C_9$-alkyl)-phenols are mentioned as chain stoppers for the polycarbonates described there.

Birefringence-free plastics which achieve this property by a system in which at least two sheet-like structures of plastic each with an optical axis perpendicular to the normal to the surface are arranged in parallel at an angle of 90°, the sum of the path differences being almost zero at all points, are known from DE-OS (German Published Specification) No. 3,327,929 (Le A 22 015). Films are preferably combined with one another so that compensation of the birefringence occurs (page 6 of the DE-OS (German Published Specification), paragraphs 2 and 3).

Examples of suitable plastics are polyaryl sulphone, polystyrene, polyvinyl chloride or polyurethane. Polymers which have good optical qualities, such as styrene/acrylonitrile copolymers, polymethylpentene, polycarbonate, polyacrylic acid esters, polymethacrylic acid esters, cellulose esters or mixtures and copolymers which contain the polymers mentioned are preferably used. Polycarbonate or mixtures of plastics which contain at least 10% by weight of polycarbonate are especially preferably used.

The polycarbonates described in DE-OS (German Published Specification) No. 3,327,929 have weight-average molecular weights $\overline{M}w$ of between 10,000 and 100,000, preferably between 20,000 and 40,000 and for cast material preferably 75,000 to 110,000 (page 12, paragraph 3 of DE-OS (German Published Specification) No. 3,327,929). Here also, p-(iso-$C_8$–$C_9$-alkyl)-phenols are not mentioned as chain stoppers.

The birefringence-free plastics according to DE-OS (German Published Specification) No. 3,327,929, as well as having adequate mechanical properties, must be capable of being processed continuously and flexibly to all the required shapes and must be chemically stable towards the influence of various auxiliary chemicals (DE-OS (German Published Specification) No. 3,327,929, pages 5/6). The birefringence-free plastics can also be coated (DE-OS (German Published Specification), page 9).

The birefringence-free plastics are suitable in all cases where, for example, a laser light source, a polarization filter, monolayers, dichroic dyestuffs or double coating layers are used (DE-OS (German Published Specification) No. 3,327,929, pages 15/16).

The general possibility of reducing the birefringence of a polymer by adding a polymer of opposite birefringence is also known (J. Hennig, Paper at the Conference "neue Polymere" ("New Polymers") in Bad Nauheim, 14./15.04.1986: "Polymere als Substrate für optische Plattenspeicher" ("Polymers as substrates for optical disc memories")).

The possibility in principle of obtaining a material of low firefringence by combination of polycarbonate and modified polystyrene is also known (Nikkei Sangyo-industry Daily of 07.02.1986 "Sumitomo Chemical Developed New Resin for Erasable Optical Disc").

There is also known, to prepare plastic systems, having reduced birefringence, by improving the compatibility of the two polymers, having opposite birefringence, via adding a third component (compare EP-OS No. 0,199,824).

On the other hand, injection moulding processing of the customary polycarbonates with phenyl or p-tert.-butylphenyl end groups in combination with non-modified polystyrene leads to injection-moulded articles which have a severe clouding and clear tendencies towards delamination because of the known incompatibility of the two systems. (Compare thereto also Japanese Offenlegungsschrift No. Sho 61-19656, Comparison Example 3.)

Only the use of polycarbonate with p-(iso-$C_8$–$C_9$-alkyl)-phenyl end groups ($M_w$=15,000-25,000), such as is described in DE-OS (German Published Specification) No. 2,842,005 (Le A 19 006) ensures a reduction of the incompatibility with polystyrene. This effect manifests itself in injection-moulded articles of these special blends in a markedly lower clouding and tendency towards delamination in comparison with customary blends.

Aromatic polycarbonates which are suitable according to the invention and have an $\overline{M}w$ of 15,000 to 25,000 and p-(iso-$C_8$–$C_9$-alkyl)-phenyl end groups are described in DE-OS (German Published Specification) No. 2,842,005 (Le A 19 006).

These are polycarbonates based on diphenols of the formula I

HO—Z—OH wherein Z is a divalent aromatic radical with preferably 6 to 30 C atoms, it also being possible for the polycarbonates to be branched by 0.05 to 2 mol %, based on the moles of diphenols employed, of compounds which are trifunctional or more than trifunctional.

The amount of p-(iso-$C_8$–$C_9$-alkyl)-phenol chain stopper is calculated in a known manner from the molecular weight to be achieved in the polycarbonate and the envisaged degree of branching, and is, for example, between 4 mol % and 9 mol %, in each case based on the moles of diphenols employed.

Suitable diphenols of the formula I which preferably contain 6 to 30 C atoms are to be understood both as mono- and as polynuclear diphenols which can contain hetero atoms and can be substituted. The following diphenols are suitable: hydroquinone, resorcinol, dihydroxydiphenyls, bis-(hydroxyphenyl)-alkanes, bis-(hydroxyphenyl)-cycloalkanes, bis-(hydroxyphenyl)sulphides, bis-(hydroxyphenyl)ethers, bis-(hydroxyphenyl)ketones, bis-(hydroxyphenyl)sulphoxides, bis-(hydroxyphenyl)sulphones, $\alpha,\alpha'$-bis-(hydroxyphenyl)-diisopropylbenzenes and nuclear-alkylated and nuclear-halogenated compounds thereof.

Such diphenols are known from the literature.

Examples of preferred diphenols are: 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, $\alpha,\alpha'$-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)sulphone, 2,4-bis-(3,5-dimethyl-4-hydroxyphenyl)-2-methylbutane, 1,1-bis-(3,5-dimethyl-4-hydroxyphenyl)-cyclohexane, $\alpha,\alpha'$-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Examples of particularly preferred diphenols are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Any desired mixtures of the abovementioned diphenols can also be used.

Suitable compounds which are trifunctional or more than trifunctional are, in particular, those with three or more than three phenolic OH groups. Examples which may be mentioned are: phloroglucine, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, hexa-(4-(4-hydroxyphenyl-isopropyl)-phenyl)orthoterephthalate, tetra-(4-hydroxyphenyl-isopropyl)-phenoxy)-methane and 1,4-bis-(4',4''-dihydroxy-triphenyl)-methyl)-benzene. Some of the other trifunctional compounds are 2,4-dihydroxybenzoic acid, trimesic acid, cyanuric chloride and 3,3-bis-(4-methyl-4-hydroxyphenyl)-2-oxo-2,4-dihydroindole.

The polycarbonates which are suitable according to the invention are preferably prepared by the phase boundary process (compare H. Schnell, "Chemistry and Physics of Polycarbonates", Polymer Reviews, Volume IX, page 33 et seq., Interscience Publ., (1964)) in a known manner.

Polystyrenes which are suitable according to the invention are homopolymers of styrene, which are obtained, for example, with an $M_w$ of 80,000 to 400,000, preferably 170,000 to 300,000 (measured in dimethylformamide at C=5 g/l and 20° C.) from the monomer by suspension polymerization in the presence of catalysts.

The mixtures according to the invention can be prepared, for example, by compounding during extrusion, and the mixtures can be processed to shaped articles or to data memories, for example by injection-moulding.

The use of the mixtures according to the invention as substrates for optical data memories can be explained as follows:

The "substrate" for optical data memories in the context according to the invention is the material of the mechanical base of a data disc which both serves as the carrier for an information layer or level and is the spacer between this information carrier and the outer—flat—disc surface.

The information-carrying light beam must pass through the substrate unchanged both for reading and for writing—en route from the flat disc surface to the opposite data side as well as—in the case of the reading beam—from this back again, after information transfer, to the outer surface, from which its exits to the detector.

Examples of optical data memories are, for example, the audio compact disc and the video disc.

EXAMPLES

1. Varying contents of polycarbonate, prepared according to DE-OS (German Published Specification) No. 2,842,005 by reaction of bisphenol A with phosgene in methylene chloride in the presence of sodium hydroxide solution as an acid acceptor and 4-(1,1,3,3,-tetramethylbutyl)-phenol as the chain stopper, with a relative solution viscosity $\eta$ rel of 1.20 (measured in methylene chloride at 5 g/l at 25° C.)=Mw of 18,500, and styrene of Mw of 250,000 were mixed (Table 1) by compounding on a ZSK 32 at 270°-290° C.

The resulting compounds were injection-moulded to flat bars of 80×12.7×1.6 mm on an Arburg 170 mini-injection-moulding machine at a melt temperature of 280° C. The birefringence of the mixtures was evaluated by measuring the path differences in the centre of the flat bars by means of a polarization microscope using a customary comparator.

2. Varying contents of polycarbonate prepared as in Example 1 and polystyrene, as indicated in Example 1, were mixed (Table 1).

3. Compact discs were injection-moulded from the 1:1 mixture of Example 1 at a material temperature of 340° C. The birefringence at the middle between the axis and edge of the disc was determined as a function of the spatial directions (Table 2).

The results from Tables 1 and 2 illustrate that, from blends of the highly positively birefringent, low-viscosity polycarbonate with good flow properties and various very highly negatively birefringent polystyrenes (Examples 1 and 2), it is possible to produce almost birefringence-free mouldings which in particular also show surprisingly good values in the tangential and radial directions (parallel to the disc surface).

TABLE 1

Birefringence of polycarbonate/polystyrene blends
Measurement of the path difference at the centre of the
bar in transmitted light (perpendicular to the bar surface)
on a flat bar of 80 × 12.7 × 1.6 mm.

| PS content | Path differences measured in nm · mm$^{-1}$ | |
| --- | --- | --- |
| % | Example 1 | Example 2 |
| 0 | 180 | |
| 20 | 160 | |
| 30 | 130 | 120 |
| 40 | 105 | 50 |
| 45 | 45 | 40 |
| 50 | 30 | 15 |
| 55 | −30 | −40 |
| 60 | −275 | −180 |
| 70 | −430 | −340 |
| 80 | −560 | |
| 100 | −770 | |

TABLE 2

Birefringence of a compact disc (120 mm $\phi$)
of a polycarbonate/polystyrene blend (Example 3).
Measurement of the path difference at the middle between
the axis and edge of the disc in transmitted light
(axially) and tangentially and radially at cross-sections.

| Substrate composition | Path differences measured in nm · mm$^{-1}$ Transmitted light | | |
| --- | --- | --- | --- |
| | (axially) | tangentially | radially |
| PC/PS 1:1 | −4 | 61 | −70 |
| PC (100%) for comparison | 5 | 540 | 580 |

We claim:

1. A thermoplastic mixture of
   (A) 90 to 20% by weight of an aromatic polycarbonate with a weight-average molecular weight, determined by gel permeation chromatography of 15,000 to 25,000 and p-(iso-$C_8$–$C_9$-alkyl)-phenyl end groups and
   (B) 10 to 80% by weight of a polystyrene with a weight-average molecular weight, determined by the relative solution viscosity in dimethylformamide at C=5 g/l and 20° C., of 80,000 to 400,000.

2. A mixture according to claim 1 of 80 to 45% by weight of the polycarbonate of component (A) and 20 to 55% by weight of the polystyrene of component (B).

3. A mixture according to claim 2 of 70 to 50% by weight of the polycarbonate of component (A) and 30 to 50% by weight of the polystyrene of component (B).

4. A mixture according to claim 1, in which the polycarbonate of component (A) is based on diphenol(s) of the formula HO-Z-OH (I) in which Z is a divalent aromatic radical with 6 to 30 carbon atoms.

5. A mixture according to claim 1, in which the polycarbonate of component (A) is any of those hereinbefore specifically identified.

6. A mixture according to claim 1, in which the polystyrene of component (B) has an $\overline{M}_w$ of 170,000 to 300,000.

7. A substrate for optical data memories whenever formed of a mixture according to claim 1.

8. A mixture according to claim 4 wherein the polycarbonate is branched by containing 0.05 to 2 mol%, based on diphenol content, of at least trifunctional branching agent compounds.

* * * * *